W. B. HAVENS.
CORN HUSKING APPARATUS.
APPLICATION FILED FEB. 10, 1908.
913,130.
Patented Feb. 23, 1909.
3 SHEETS—SHEET 1.
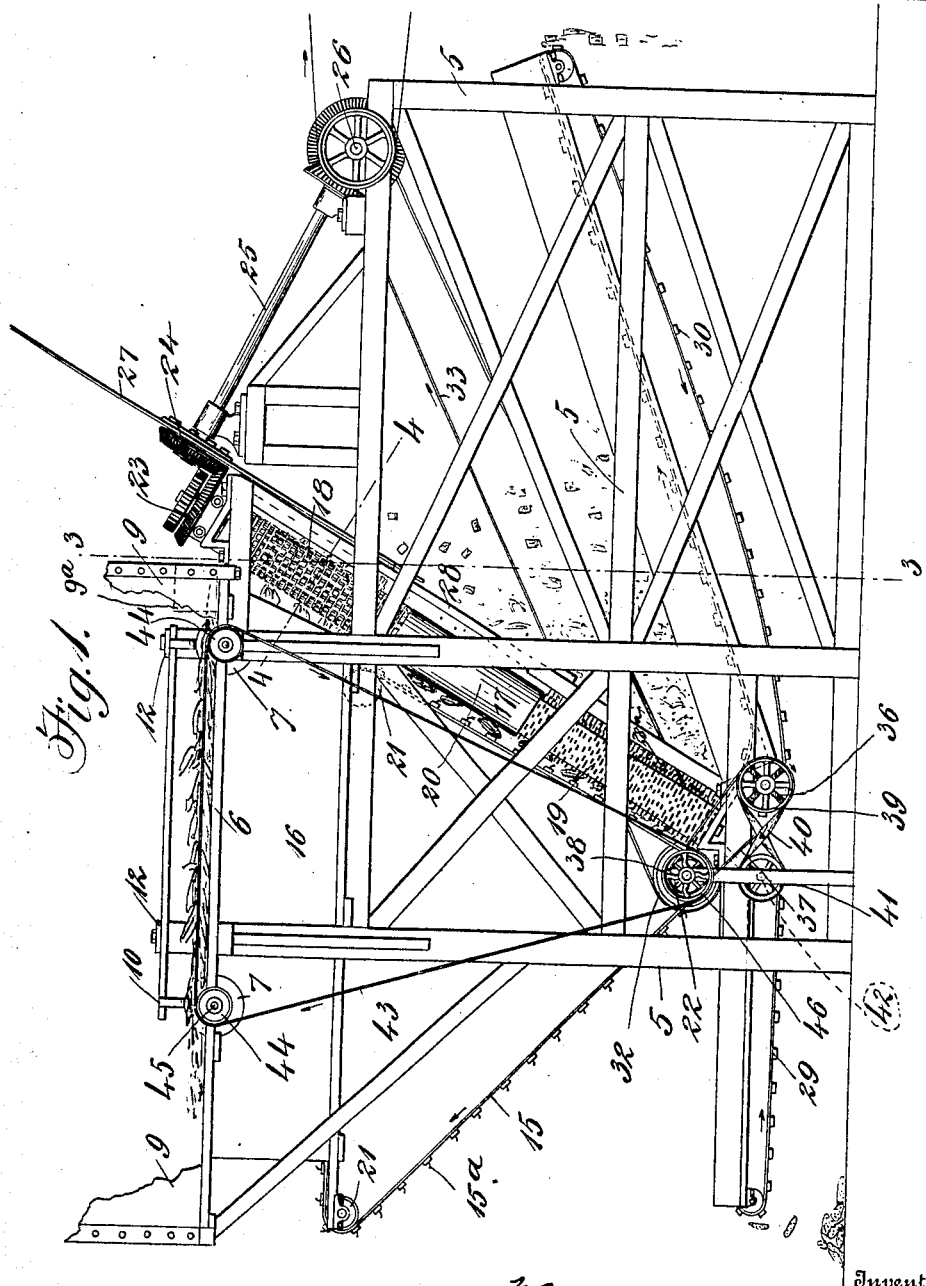

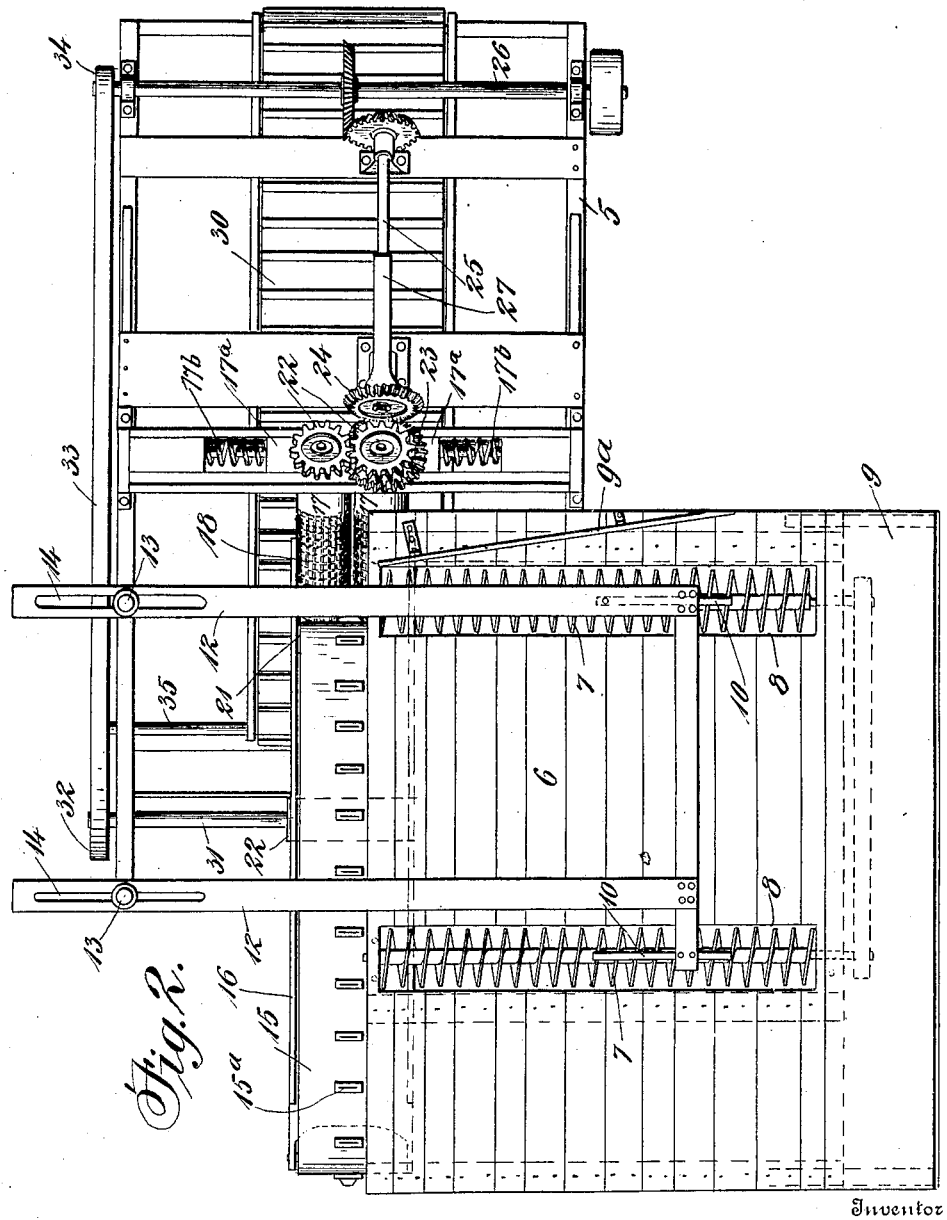

W. B. HAVENS.
CORN HUSKING APPARATUS.
APPLICATION FILED FEB. 10, 1908.
913,130.
Patented Feb. 23, 1909.
3 SHEETS—SHEET 3.
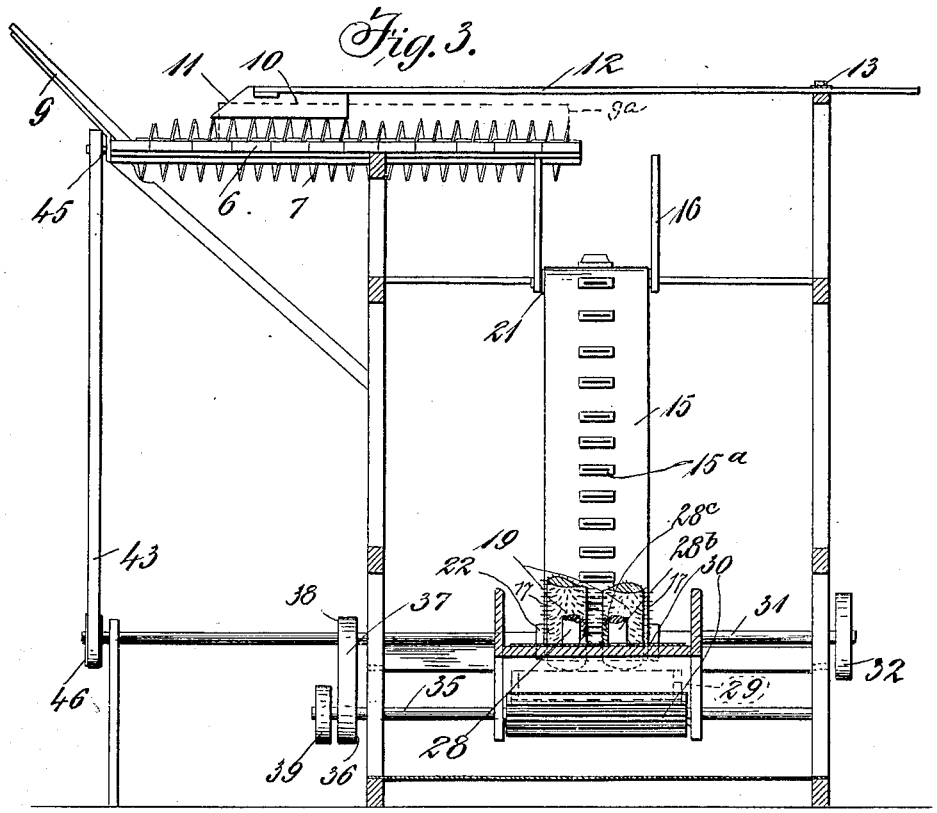
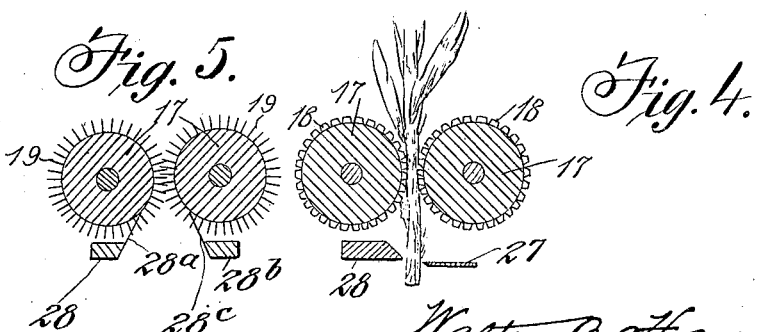
Walter B. Havens.
Inventor

UNITED STATES PATENT OFFICE.

WALTER B. HAVENS, OF HARTFORD CITY, INDIANA.

CORN-HUSKING APPARATUS.

No. 913,130.           Specification of Letters Patent.           Patented Feb. 23, 1909.

Application filed February 10, 1908. Serial No. 415,184.

*To all whom it may concern:*

Be it known that I, WALTER B. HAVENS, a citizen of the United States, residing at Hartford City, in the county of Blackford and State of Indiana, have invented certain new and useful Improvements in Corn-Husking Apparatus, of which the following is a specification.

This invention relates to corn-husking apparatus, and has for its object to provide an improved apparatus which removes the ears from the stalks and strips the husks from the ears, and also chops up the stalks for use as fodder.

A further object of the invention is to provide an apparatus of this kind which is simple in construction, and inexpensive to operate.

The invention also aims to provide a pair of combined snapping and husking rollers, and improved means for carrying the stalks to the former, and the several ears to the latter.

The invention is illustrated in the accompanying drawings in which—

Figure 1 is a side elevation, and Fig. 2 a plan view thereof. Fig. 3 is a vertical section on line 3—3 of Fig. 1, the snapping and husking rollers being shown broken away. Fig. 4 is a sectional detail on the line 4—4 of Fig. 1. Fig. 5 is a sectional detail of the husking portion of the rollers and the coöperating stripper comb hereinafter referred to.

In the drawings 5 denotes the supporting frame of the apparatus. At the top of said frame, at one end thereof, is a feed-table 6 on which the stalks to be operated on are placed. The feed-table projects from one side of the supporting frame, and has means for straightening out the stalks and carrying them butt-ends forward to the snapping and husking rollers. Such means comprises a pair of suitably spaced parallel extending screw conveyers 7 mounted in slots 8 in the table, and projecting above the same a proper distance so that they can take hold of the stalks. At the outer edge of the table is an inclined board 9 to hold the stalks thereon, and near said end of the table are blocks 10 for directing the stalks to the conveyers. These blocks are located above the conveyers and set close thereto, and have beveled front ends 11. The blocks are carried by bars 12 secured to the supporting frame by bolts 13 passing through slots 14 in the bars. By slotting the bars as stated, the blocks 10 can be set closer to or farther away from the endboard 9 according to the quantity of stalks on the table. The stalks are dumped on the table, and are directed by the inclined board 9, as well as by the beveled portion 11 of the blocks 10, to the conveyers. For the purpose of evening up the butt-ends of the stalks in their travel across the table I locate an upright board 9$^a$ at the rear end of the table. This board is set so as to converge toward the inner or discharge ends of the conveyers, by reason of which the butt-ends of the stalks are evened up when they come in contact with the board and are carried along the same. The conveyers 7 are so located with respect to the snapping and husking rollers that the stalks are drawn between the latter when they reach the ends of the conveyers. Any stalks missing the rollers drop on the horizontal portion of an endless belt 15 traveling toward the rollers, and armed with fingers 15$^a$ which catch the stalks and push them between the rollers. The belt is located a short distance below the inner edge of the table, and it travels through a trough 16 which prevents the stalks from dropping off the belt.

The means for snapping the ears off the stalks and removing the husks from the ears are a pair of upright rollers 17 journaled in suitable bearings 17$^a$ on the supporting frame. The rollers are inclined toward the rear end of the apparatus, and near their upper ends they have a roughened or corrugated surface 18. This portion of the rollers acts to snap the ears off the stalks. The lower ends of the rollers are armed with spikes 19, and this part of the rollers acts on the severed ears to remove the husks therefrom. Between the roughened and spiked parts of the rollers is a plain portion 20 which is for a purpose to be hereinafter described.

The belt 15 passes over guide-pulleys 21 at the ends of the horizontal portion thereof, and over a guide-pulley 22 below the same. The guide-pulleys 21 are mounted at the ends of the trough 16. One of the pulleys 21 is located close to the upper end of the snapping and husking roller, and the belt travels over said pulley and then downward along said rollers in close proximity thereto, and parallel to their axis, so that the severed ears are forced against the spiked portion of the rollers and the husks torn off.

The bearings 17ᵃ of the snapping and husking rollers are made yielding to permit different sizes of stalks to pass therebetween by means of springs 17ᵇ which press behind the bearings, the latter being slidably mounted in suitable guide-frames at the top of the supporting-frame of the machine. On the journals of the rollers are spur-gears 22 which mesh. The teeth of said gears are sufficiently deep to permit the yielding movement of the rollers. One of said spur-gears is formed with a bevel gear 23 which meshes with a bevel gear 24 on a shaft 25 extending transversely and at right angles to the axis of the rollers. This shaft is geared to the main drive-shaft 26 of the apparatus. On the shaft 25, immediately behind the snapping and husking rollers, is mounted a cutter for chopping up the stalks as they issue from the rollers after the ears have been torn off. The cutter comprises two or more blades 27 secured to and extending radially from the shaft 25. The length of each blade is about the same as the length of the roughened portions 18 of the rollers. The blades rotate with the shaft 25 and travel past a stationary shear-blade 28 located close to one of the rollers. The stalks as they issue from the rollers travel past this shear-blade, and are chopped up into small pieces for use as fodder by the rotating cutter.

Behind the spiked or husking portion 19 of the rollers are located combs for removing the husks therefrom if they have a tendency to wrap or stick to the rollers which is often the case when the husks are damp. A comb is provided for each roller. One of the combs may be formed by continuing the shear-blade 28 so as to extend along the husking portion of one of the rollers parallel thereto and arming said extension with teeth 28ᵃ which approach said roller tangentially and enter between its spikes 19. The comb for the other roller is a bar 28ᵇ extending parallel to the husking portion of the roller and armed with teeth 28ᶜ arranged in the same manner as the teeth 28ᵃ. The bar 28ᵇ may be secured to the supporting frame of the apparatus in any suitable manner.

At the lower end of the snapping and husking rollers is a conveyer 29 which carries the husked ears away. The chopped up stalks drop on a conveyer 30 which dumps them on the ground or into a suitable receptacle.

The following gearing is employed for driving the various parts of the apparatus herein described: On the shaft 31 of the pulley 22 is a pulley 32 which is connected by a belt 33 with a pulley 34 on the main drive-shaft 26. The drive shaft 35 of the conveyer 30 is fitted with a pulley 36 which is connected by a belt 37 with a pulley 38 on the shaft 31. On the shaft 35 is also a pulley 39 which is connected by a crossed belt 40 with a pulley 41 on the drive shaft 42 of the conveyer 29 whereby the latter is driven in the proper direction to carry the husked ears from the husking rollers to a suitable receptacle. The conveyers 7 are driven by a belt 43 passing over pulleys 44 on the shaft 45 thereof, and over a pulley 46 on the shaft 31. Instead of the belt gearing as herein described sprocket wheels and chains may be employed.

The operation of the apparatus will be understood from the foregoing description, but it may be summarized as follows: The stalks are placed on the table 6 with their butt-ends toward the snapping and husking rollers, and they are fed in this position to said rollers by the conveyer 7 and the belt 15. The portion 18 of the rollers snap off the ears and they are carried down singly to the plain portion 20 and the spiked portion 19 of the rollers by the belt 15. The fingers 15ᵃ of the belt force the ears against the spikes and insure the removal of the husks. The object of the plain portion of the rollers is to prevent the corn from being shelled by the pressure of the belt 15. The husked ears drop on the conveyer 29 and are carried away. The husks pass between the rollers and drop on the conveyer 30 to be carried away. The stalks as they issue from the rollers are chopped up by the cutter 27 and drop on the conveyer 30. If the husks have a tendency to wrap they are removed by the teeth 28ᵃ and 28ᶜ as hereinbefore described.

The apparatus herein described can be driven from any suitable source of power applied to the main drive-shaft 26. It is simple in construction, can be cheaply built, and it effectually serves the purpose for which it is intended.

I claim:—

1. In a corn-husking apparatus the combination of a pair of snapping and husking rollers, a feed-belt traveling toward the same, a feed-table, and a screw-conveyer working on the feed-table with its axis extending at right angles to the direction of travel of the feed-belt for carrying the stalks butt-ends forward to said belt.

2. In a corn-husking apparatus, the combination of a pair of snapping and husking rollers, a feed-belt traveling toward the same, a feed-table, and a stalk-conveyer working across the feed-table at substantially a right-angle to the line of travel of said feed-belt and discharging the stalks on the feed-belt with their butt-ends presented toward the rollers.

3. In a corn-husking apparatus, the combination of a pair of snapping and husking rollers, a feed-belt traveling toward the same, a feed-table, a stalk conveyer working across the table at substantially a right-angle to the line of travel of said feed-belt and discharging the stalks thereon, and a board extending across the table in the path of the butt ends of the stalks and converging toward the discharge end of the conveyer, for evening up said ends of the stalks.

In testimony whereof I affix my signature, in presence of two witnesses.

WALTER B. HAVENS.

Witnesses:
EDWARD C. IRKES,
ALBERT HENDERSON.